United States Patent
Chao et al.

(10) Patent No.: US 8,352,236 B2
(45) Date of Patent: Jan. 8, 2013

(54) FAULT TREE ANALYSIS SYSTEM FOR THE INSTRUMENT CONTROL PROCESS FOR NUCLEAR POWER PLANT WITH ADVANCED BOILING WATER REACTOR BACKGROUND

(75) Inventors: Chun-Chang Chao, Taoyuan County (TW); Meng-Chi Cehn, Taoyuan County (TW)

(73) Assignee: Institute of Nuclear Energy Research, Longtan (TW)

( * ) Notice: Subject to any disclaimer, the term of this patent is extended or adjusted under 35 U.S.C. 154(b) by 1119 days.

(21) Appl. No.: 12/253,219

(22) Filed: Oct. 16, 2008

(65) Prior Publication Data

US 2010/0100251 A1   Apr. 22, 2010

(51) Int. Cl.
G06G 7/54 (2006.01)
(52) U.S. Cl. .......................................... 703/18; 706/45
(58) Field of Classification Search ................ 703/18, 703/6; 706/45
See application file for complete search history.

(56) References Cited

U.S. PATENT DOCUMENTS

| | | | | |
|---|---|---|---|---|
| 5,023,045 A | * | 6/1991 | Watanabe et al. | 376/215 |
| 5,361,198 A | * | 11/1994 | Harmon et al. | 700/83 |
| 5,799,294 A | * | 8/1998 | Tanaka | 706/46 |
| 6,557,530 B1 | * | 5/2003 | Benson et al. | 123/480 |

OTHER PUBLICATIONS

Marques "Reliability of passive system that utilize natural circulation" IAEA Nov. 2005, p. 581, 617-620.*
Kang et al. "Fault-tree-based risk assessment for dynamic condition changes."., Nuclear Engineering and Technology, vol. 39 No. 2 Apr. 2007., p. 139-144.*

* cited by examiner

Primary Examiner — Eunhee Kim

(57) ABSTRACT

The invention relates to the fault tree analysis system for a nuclear power plant with advanced boiling water reactor. The full digital instrument control system uses six different modes to simulate the transmission of the digital signals and the analog signals from the detection units. It is to develop the fault tree for various signal transmission modes to support the nuclear power plant in probabilistic risk assessment (PRA) and meet requirements for simulated signal detection, transmission, logic operation and equipment actuation. Thus, the digital instrument control flow process can fit into PRA model and properly reflect its importance in risk assessment.

4 Claims, 15 Drawing Sheets

FAULT TREE ANALYSIS SYSTEM FOR THE INSTRUMENT CONTROL PROCESS FOR NUCLEAR POWER PLANT WITH ADVANCED BOILING WATER REACTOR BACKGROUND

FIELD OF THE INVENTION

The invention relates to the technical field for fault tree analysis for the instrument control process, especially the fault tree analysis system for a nuclear power plant with advanced boiling water reactor.

DESCRIPTION OF THE PRIOR ART

With the flourishing development of digitization technology, the stability and the reliability for the network system and the related parts and modules for digitized instrument control have reached to the standard for extensive applications to high-risk facilities. Therefore, large-scale instrument control system that stresses reliability preferably uses network system as the framework for instrument control signal transmission. The nuclear power plant with advanced boiling water reactor that adopts digital instrument control has very different control system operation than the traditional all-analog control system. As a result, when the nuclear power plant with advanced boiling water reactor is executing PRA, the analyst always fails to use a suitable fault tree analysis to assess every risk parameter for digital instrument control.

The design of digital instrument control for the nuclear power plant with advanced boiling water reactor is to change the hard wire signal transmission for the traditional nuclear power plant to network system signal transmission. Although it greatly reduces hard wire and the quantity for various instrument control units in the signal transmission process, it also brings about issues like network system reliability and common cause failure that would affect the reliability for the entire digital instrument control system. Besides, the detectors for water level, pressure, temperature and rotation speed in a nuclear power plant with advanced boiling water reactor are not completely digitized and still use traditional analog signal transmission. The control unit for actuation equipment is also not completely digitized and still only accepts the traditional analog signal. For risk assessment for the control system with both traditional analog and digital instrument control, the present stage only involves the reliability analysis for a single system. For system design, due to lacking suitable fault tree analysis for digital instrument control in PRA, it fails to conduct all application assessments for the nuclear power plant with advanced boiling water reactor.

SUMMARY OF THE INVENTION

For safety consideration, the safety equipment for the nuclear power plant with advanced boiling water reactor is operated with multiple signal sources and mixed traditional analog signals and digital signals to increase signal reliability. After reviewing the nuclear power plant with advanced boiling water reactor for safety and non-safety related digital instrument design and including eight instrument control modules, the entire digital instrument control process is divided to six different types, based on which the standard fault tree is developed to support PRA for the needs like simulated signal detection, transmission, logic operation and equipment operation. Therefore, the developed PRA may properly reflect the importance of digital instrument control process on risk.

The developed fault tree will use external connection mode to simulate the failure mode for each instrument control module and cover all basic events in PRA, including detection unit failure, digital instrument control unit failure, power failure, common cause failure for the same type of modules and personal operation errors.

To conduct signal failure analysis for the instrument with multiple signal sources, the system fault tree from the invention can be used to establish procedures for signal split, corresponding standard fault tree selection and fault tree connection etc. It is fast and accurate to establish instrument operation fault tree.

DETAILED DESCRIPTION OF THE INVENTION

Figure 1:
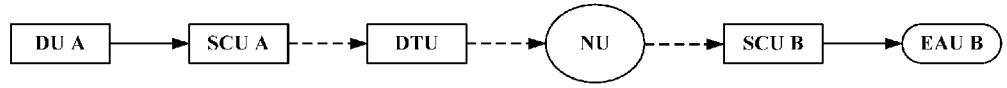
FIG. 1: Flow process diagram for automatic actuated equipment with single measurement unit (mode 1)

In the design of the digital instrument control for a nuclear power plant with advanced boiling water reactor, the master control room is responsible for signal logic operation and automatic and manual signal generation. Various types of signals subject to signal logic operation come from reactor building, control room building, steam generator building and switch building, where the detection units are located. The signal actuation r equipment in the control room is also located in the above buildings. The signal transmission between buildings, switch buildings and master control room is completed through network system. To comply with the characteristic for network system to transmit digital signals only, the analog signal generated by the detection unit is converted to digital signal before entering network system. The digital signal from the network system is also converted to analog signal first to comply with the characteristic for equipment actuation to accept analog signal only.

The digital instrument control design for the nuclear power plant with advanced boiling water reactor can be divided into the following eight different units, which can facilitate the simulation for signal transmission and operation by Boolean algebra during fault tree analysis.

The following Provides Details About the Function and Characteristics for Each Unit:

Detection Unit (DU):

They are responsible for detecting signals of water level, pressure, temperature and rotation speed and output continuously analog signals.

Signal Convert Unit (SCU):

They are responsible for signal conversion. When the input signals are analog, they will be converted to corresponding digital signals and sent out. When the signals are digital, they will be converted to corresponding analog signals and sent out and sent out. Each signal conversion unit is only responsible for a single signal conversion. Thus, each measurement unit or actuation unit has its own designated signal conversion unit to handle single conversion for a single signal.

Data Trip Unit (DTU):

They are responsible for verifying digital signals from measurement units. When the signal meets the default setting, it outputs digital trip signal, which can be transmitted to equipment end to actuation single equipment or to logic processing unit for logic operation.

Network Unit (NU):

They are responsible for signal transmission between main control room and other remote control unit. Although network units can transmit massive volume of signals, to prevent single failure to adversely affect instrument control system, the nuclear power plant with advanced boiling water reactor divides the network units to safety and non-safety related types. All the non-safety related signal transmission is through a single non-safety related network unit. Since the safety related signal transmission involves safety related system operation, network units are deployed according to safety system division. Each safety related division has a completely independent network unit. All safety related signals are transmitted through the network unit in their designated division.

Logic Processing Unit (LPU):

They are responsible for all signal logic operation and output the results to equipment actuation units to activate the equipment startup, shut off, operation and stop. Besides outputting single signals to actuation single equipment, they also output multiple signals to actuation multiple equipments according to logic setting. Because of the need of receiving signals from different terminals, the unit is always located in the control room and all digital signals through network unit transmission are concentrated in the logic processing units in the control room for further logic operation. The output signals are also transmitted to the destination through the network unit.

Equipment Actuation Unit (EAU):

Equipment actuation unit is located near the equipment to be actuated and responsible for equipment startup, shut off, operation or stop according to the input signals. Since the unit only accepts analog signal, when the source signal is digital, it is necessary to convert it to analog signal through signal conversion unit.

Mechanical Signal Generation Unit (MSGU):

The manually generated equipment actuation signal can be designed to be digital or analog. When the designed output signal is digital, it can be transmitted to destination through network unit or after logic operation by logic processing unit it become single equipment actuation signal or multiple equipment actuation signal. If the designed output signal is analog, it will be transmitted through the designated signal transmission line directly to the equipment actuation unit. The unit is located on the control panel of the control room and operated by the operation room personnel through press button or turn knob to drive the unit to generate the preset analog or digital output signal.

Video Signal Generation Unit (VSGU):

This is a unique design for the nuclear power plant with advanced boiling water reactor. Through a single screen, it enables a large number of system or module operations. Through tough screen function the operator can touch and select the control menu for the operation system or module to be operated and through the operation function on the control menu touch and select the desired system or module. The unit is located in the control room and comprised of the screen for display and operation, the computer for display management and operation, and the unit to generate and output digital signals according to the setting. After the operator makes a selection on the touch screen, the unit generates the corresponding digital output signal, which then through logic processing unit drives multiple systems or is directly transmitted through network unit to the corresponding equipment actuation unit to drive single system or equipment.

After dividing the entire digital instrument control system into the above eight units, the related digital instrument control for the nuclear power plant with advanced boiling water reactor according to the actual design can be divided into six operation modes as shown in the figures from FIG. 1 to FIG. 6. The blocks in the figures represent instrument control units. Signal transmission is represented by solid line for analog signal and by dot line for digital signal through optical fiber. The standard fault tree corresponding to each operation mode is shown in sequence from FIG. 7 to FIG. 12.

Figure 13:
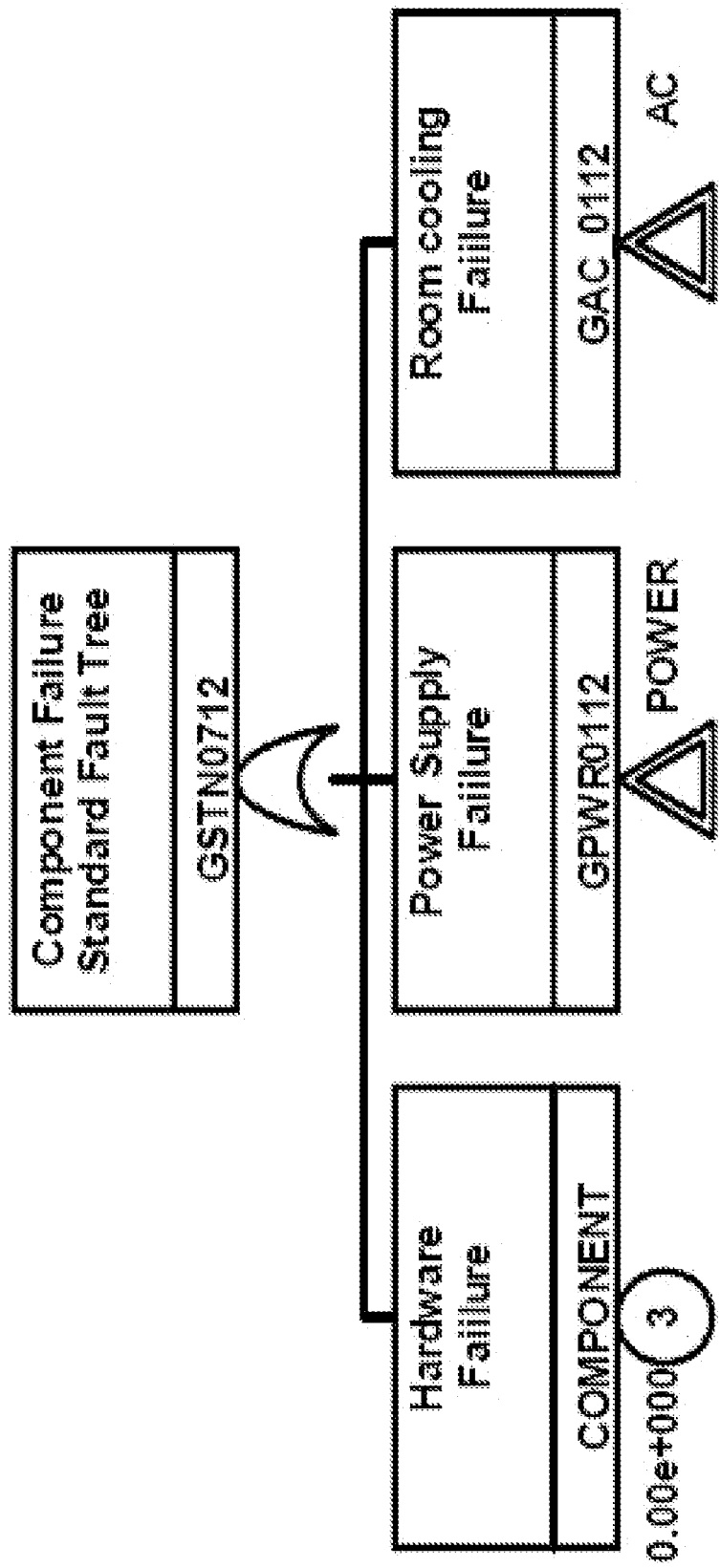
FIG. 13: Common standard fault tree for unit failure.

The failure mode for each instrument control unit is the traditional hardware failure mode. It is all simulated by externally connected fault tree. Besides, in FIG. 13 a common type is used to represent the development mode for the fault tree for each instrument control unit. In addition to the spontaneous hardware failure for instrument control unit itself, there are also failure modes indirectly caused by foreign support system like power and air conditioning. Further, the common cause failure as a critical cause to system failure is also simulated in the developed standard fault tree. According to the design concepts for the digital instrument control for the nuclear power plant with advanced boiling water reactor, the essential common cause failure mainly includes the following reasons:

1. Several detection units (DU) for the same type or identical signal detection fail at the same time due to design flaw, poor environment for equipment location, poor maintenance or incorrect calibration.

2. Several data trip units (DTU) for verifying signals fail at the same time due to software design flaw, poor database or maintenance.

3. Several network units (NU) for massive signal transmission fail at the same time due to software design flaw, failure for network system to support simultaneous signal transmission needs or poor maintenance.

4. Several logic-processing units (LPU) for signal logic operation fail at the same time due to software design flaw or poor maintenance.

According to the above reasons for common cause failure, in the standard fault tree simulation is conducted for common cause failure mode with focus on measurement unit, data trip unit, network unit and logic processing unit, while other instrument control units do not simulate common cause failure. The following briefly describes the characteristics for each operation mode and important subjects for the development of standard fault tree.

Mode 1: Automatic Actuation Equipment for Single Measurement Unit

Figure 7:
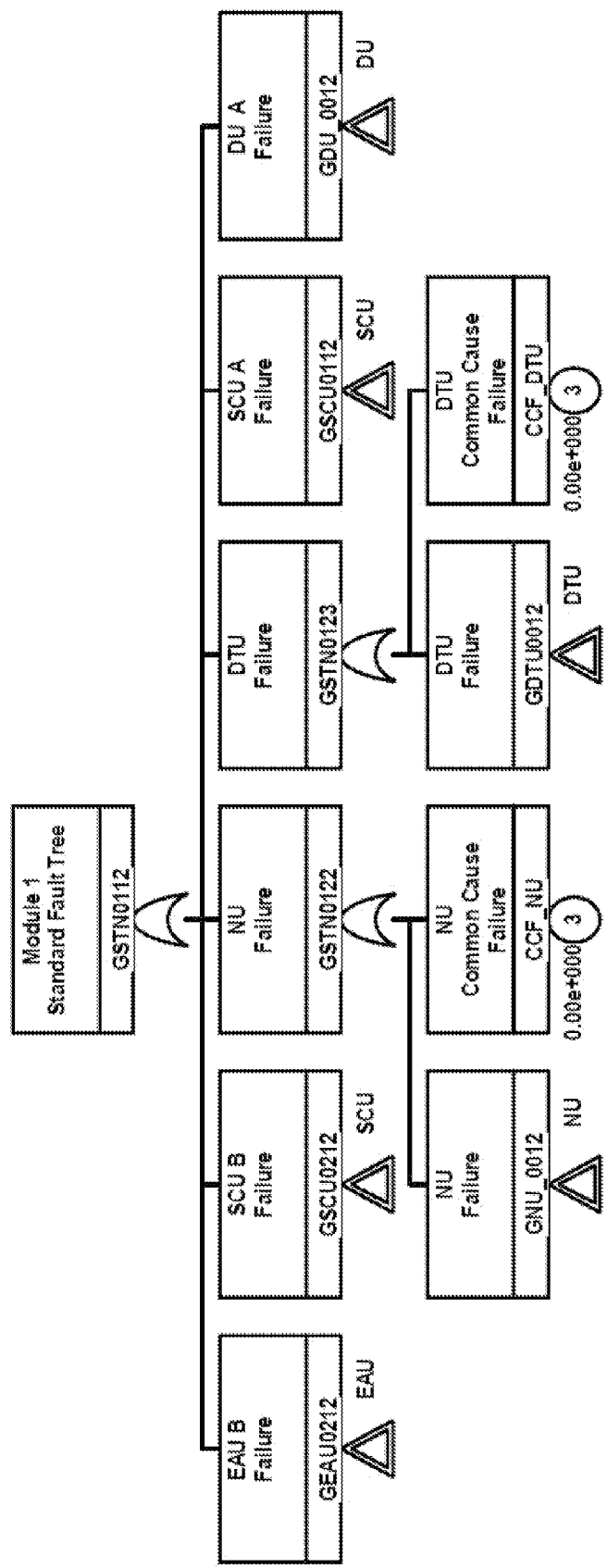
FIG. 7: Standard fault tree for mode 1.
Figure 8A:
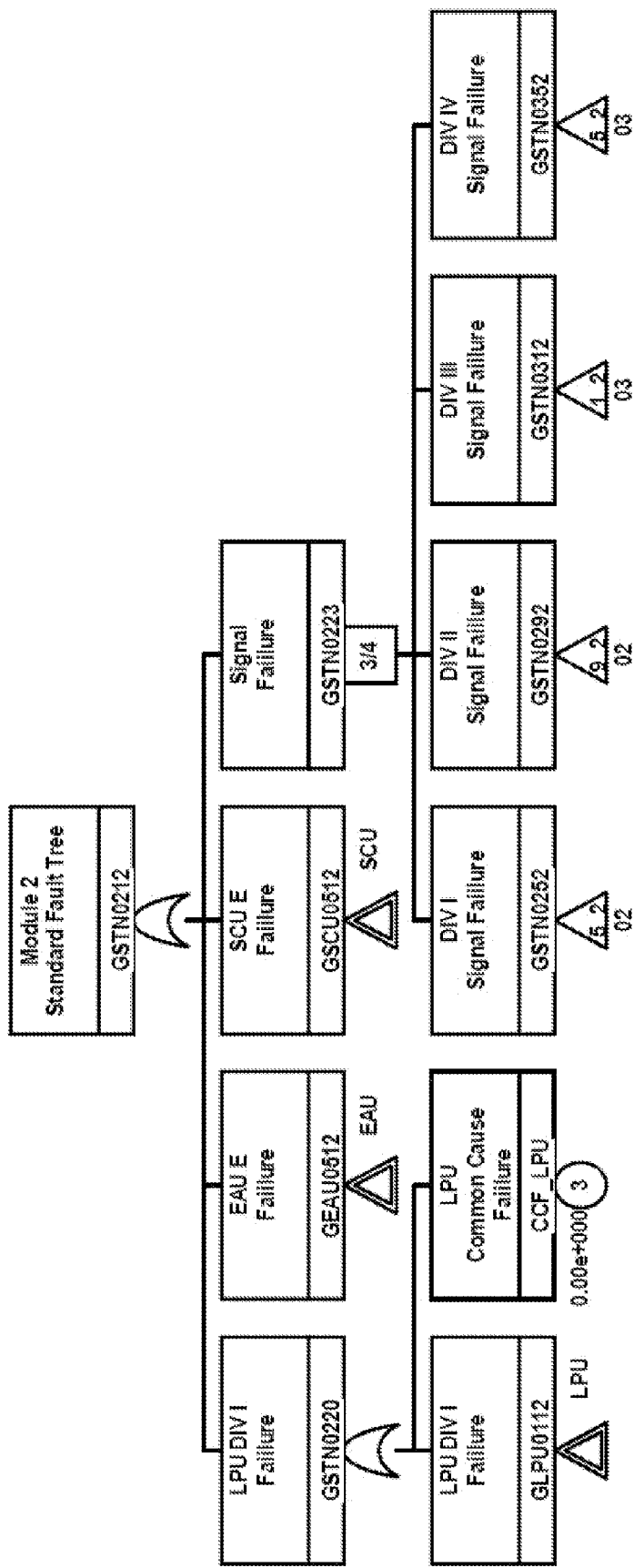
FIG. 8A~8E: Standard fault tree for mode 2.
Figure 8B:
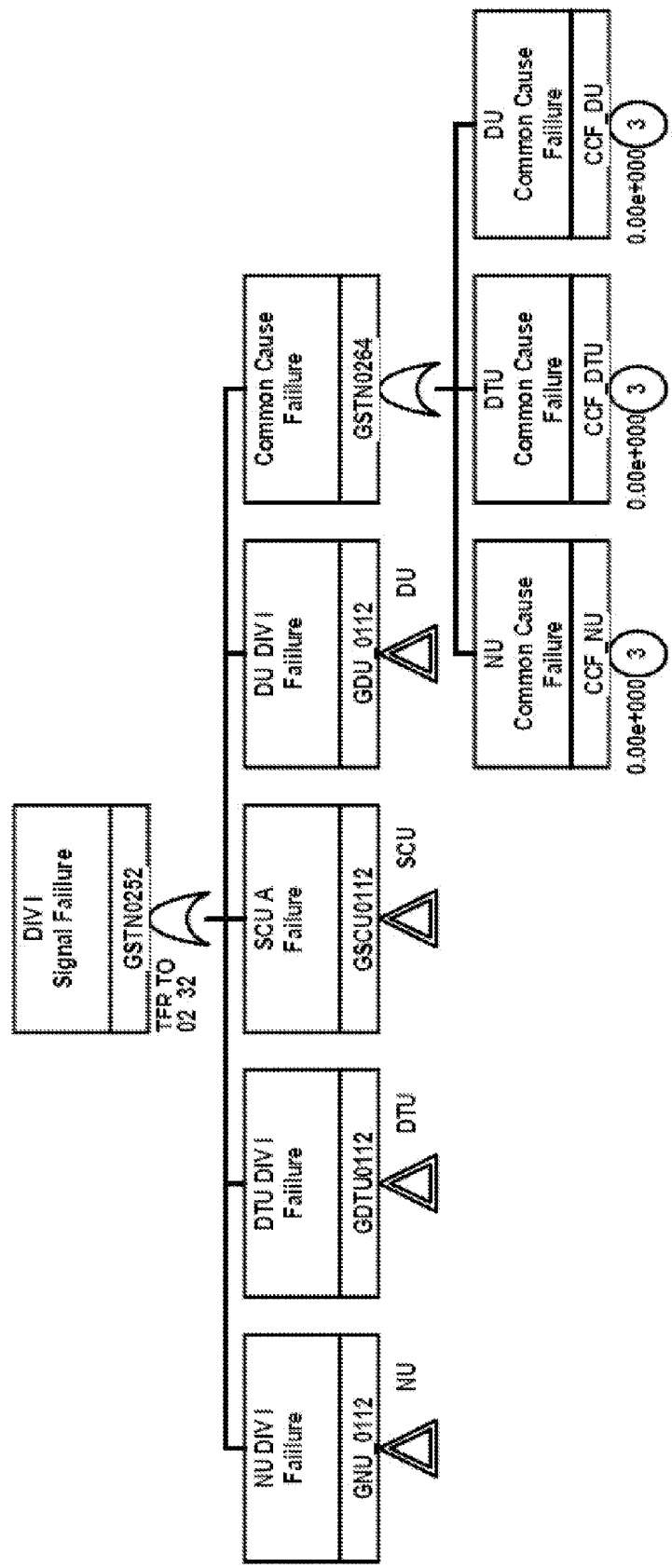
Figure 8C:
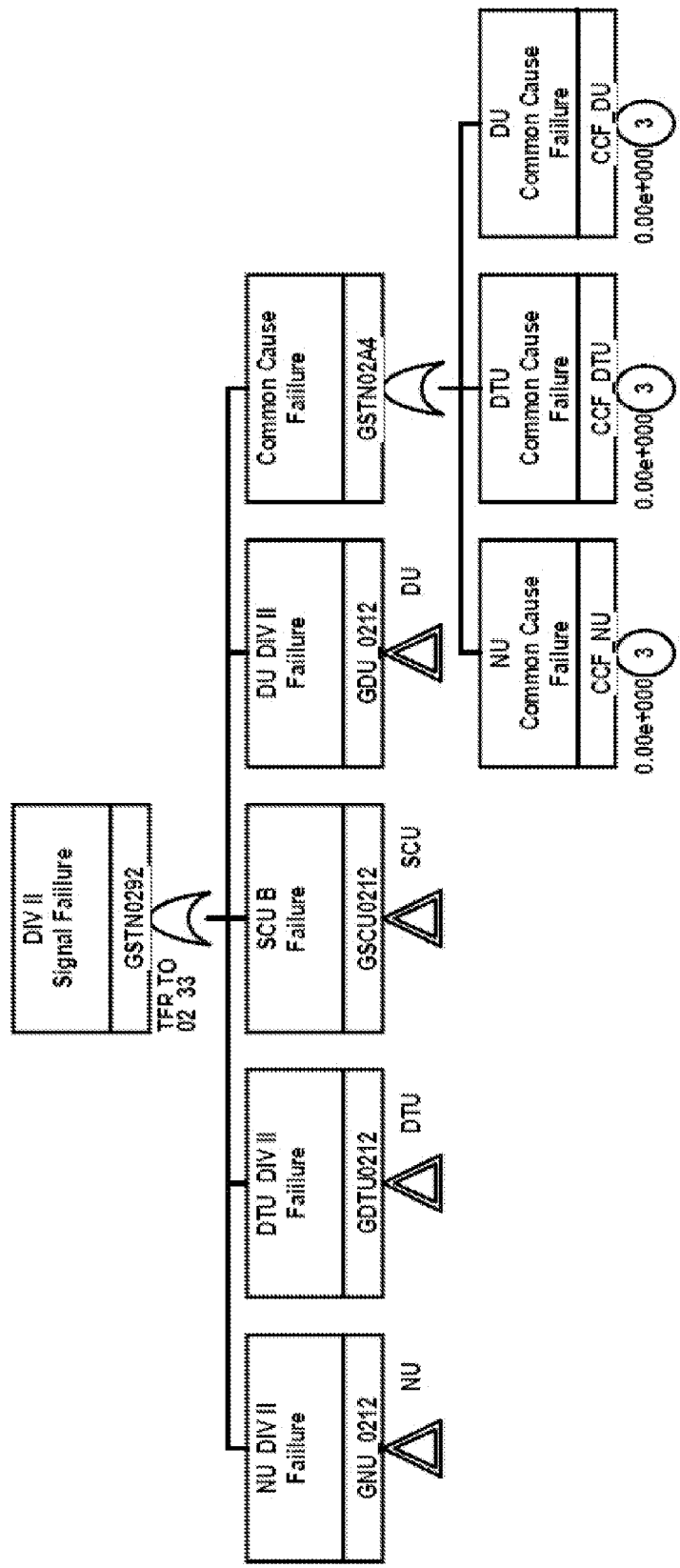
Figure 8D:
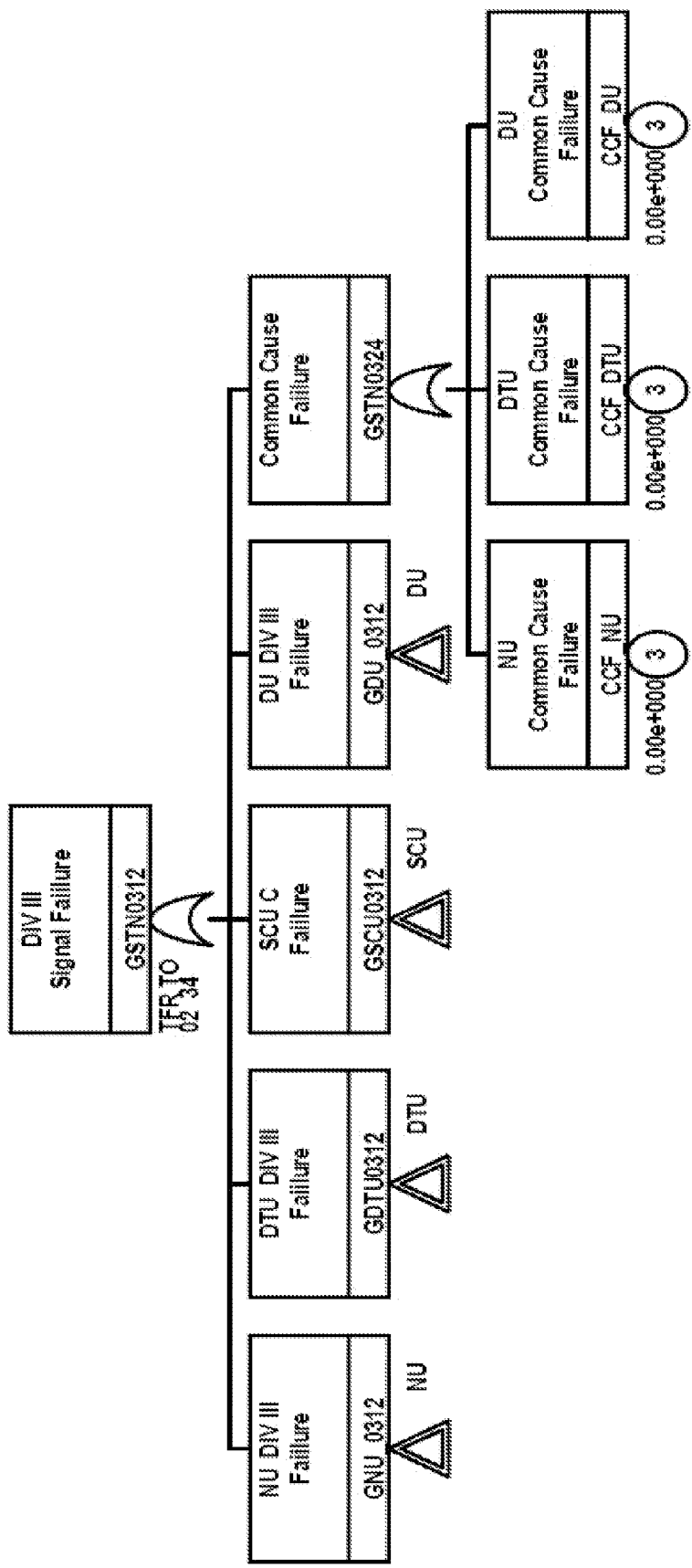
Figure 8E:
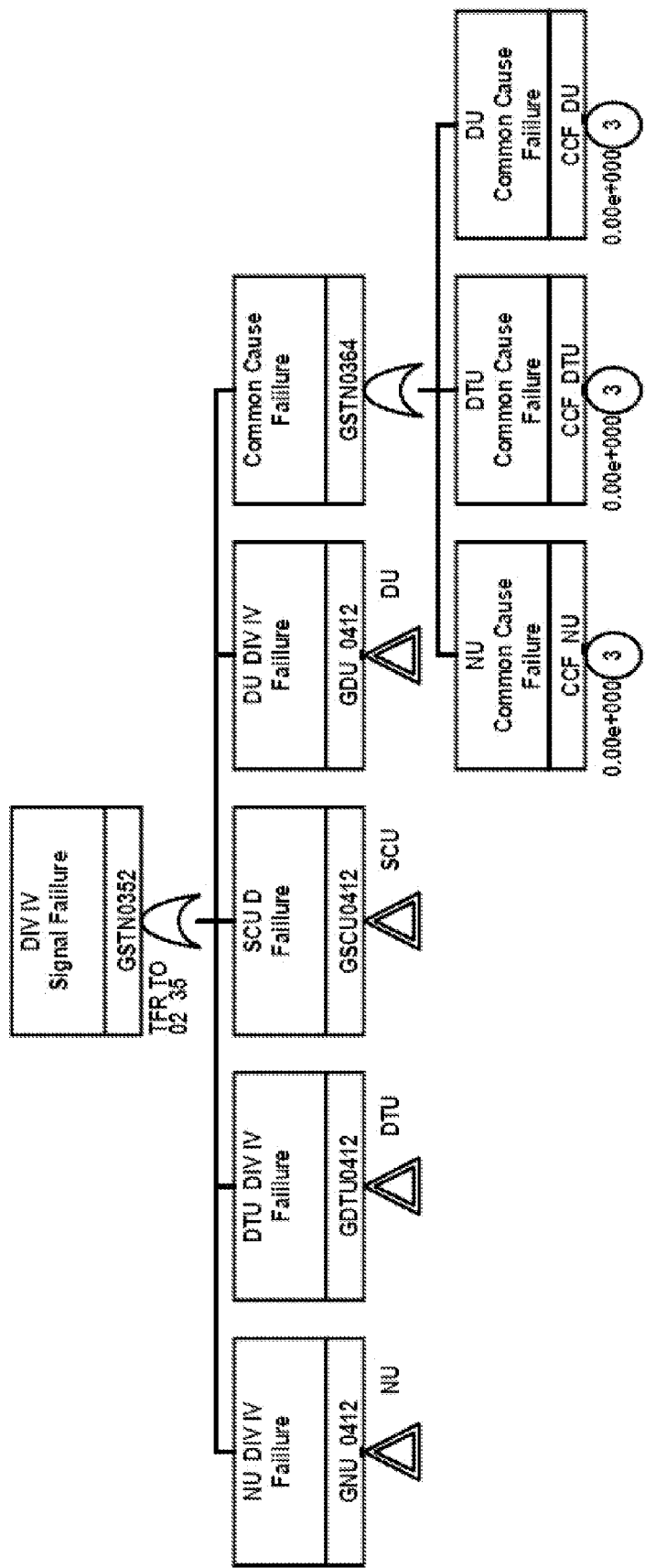

The operation process as shown in FIG. 1 is mainly for actuation of supporting equipments to non-safety or safety related equipments. It is the instrument control design without fault tolerance. After the analog signal from single measurement unit is converted to digital signal by the signal conversion unit and input to data trip unit to verify with the setting. Then the data trip unit outputs trip signals to the designated signal conversion unit to the specific equipment. The digital signal is converted to analog signal and output to the equipment actuation unit to actuate the equipment. The developed fault tree is shown in FIG. 7. Since it is serial linear process, the failure of any unit will cause the failure of the entire instrument control process. Mode 1 only has single signal measurement unit and therefore does not simulate common cause failure for measured signals.

Figure 2:
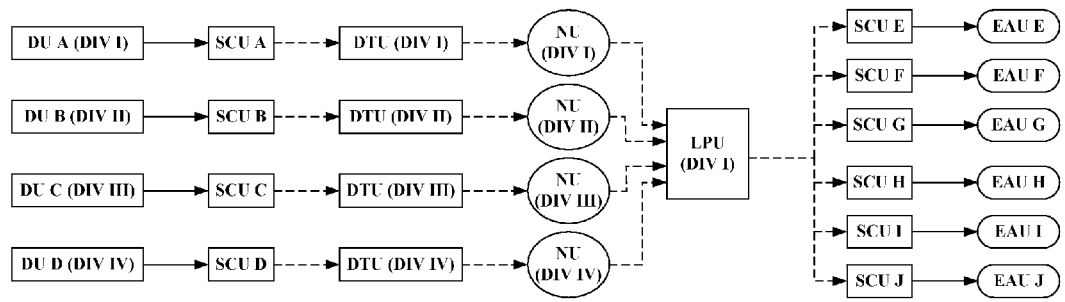
FIG. 2: Flow process diagram for multiple measurement unit after logic operation to automatically actuate multiple equipments (mode 2)

Mode 2: Multiple Measurement Unit After Logic Operation Automatically Actuates Multiple Equipments The operation process as shown in FIG. 2 is mainly used for safety related equipment. To prevent unnecessary action due to failures for some measurement units or data trip units, the measurement signals from several different measurement units of the same design are concentrated in the logic-processing unit for logic operation. With fault tolerance, the logic-processing unit undergoes logic operation and outputs single or multiple equipment operation signals. The signals are transmitted to the signal conversion unit through the network unit. The input digital signal is converted to analog signal and then input to the equipment actuation unit to actuate the equipment. The operation for the safety related equipments of the nuclear power plant with advanced boiling water reactor is handled by four independent instrument control divisions. Signal measurement, conversion and transmission are all conducted by the specific independent division. When the logic-processing unit is undergoing logic operation, it adopts two-out-of-four fault-tolerant strategy. It means it is not until at least two divisions input trip signals, the logic-processing unit will output equipment operation signal. In the development for the standard fault tree as shown in FIG. 8A~8E, the fault-tolerant strategy should be changed and therefore it is not until at least three divisions have fault the logic processing unit will output equipment operation signals. The standard fault tree for mode 2 is developed with focus on unit E failure. Since unit E belongs to division I (DIV I), after the operation signal is processed and output by the logic processing unit in DIV I, the logic units in other divisions (DIV II~DIV IV) also process and output the signals that are verified and come from their own measurement unit. In the simulation of common cause failure, measurement unit, data trip unit, network unit and logic processing unit are involved. For failure of other units (unit F~unit J), except for the use of their own designated signal conversion unit and equipment actuation unit, they have the same signal source and the simulation mode for common cause failure as unit E.

Mode 3: Mechanical Operation Panel to Actuate Single Equipment

Figure 3:
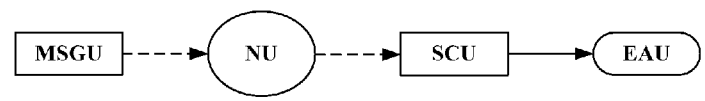
FIG. 3: Flow process diagram for mechanical operation panel to actuate single equipment (mode 3)
Figure 9:
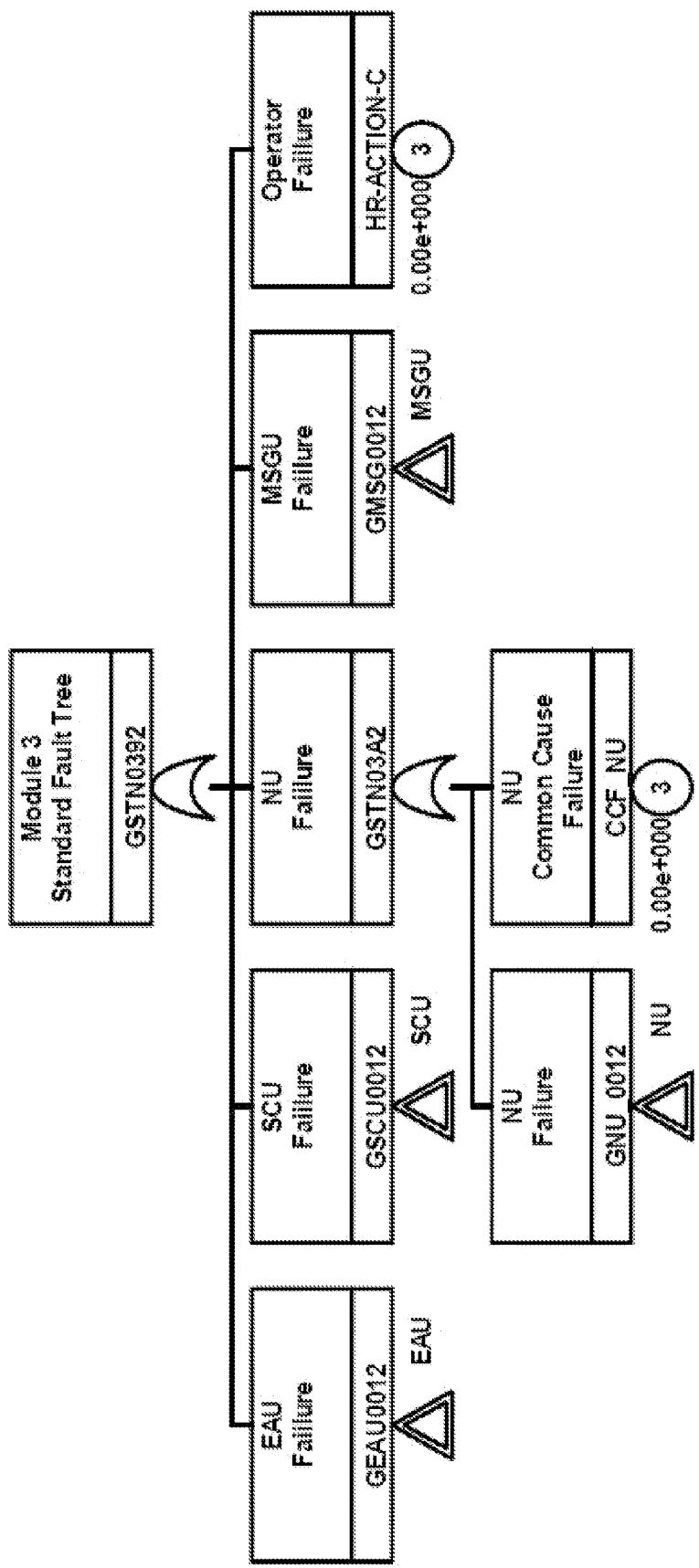
FIG. 9: Standard fault tree for mode 3.

The operation process is shown in FIG. 3. When the operator presses the button or turns the knob on the operation panel, the corresponding mechanical signal generation unit will output a digital signal and transmit the signal through the network unit to the signal conversion unit. Then the digital signal will be converted to analog signal and input to the equipment actuation unit to actuate the equipment. The developed standard fault tree is shown in FIG. 9. Since it is serial linear process, the failure of any unit will cause the failure of the entire instrument control process. Since the equipment actuation relies on manual operation by the operator, the fault tree also includes the failure mode for manual operation by the operator.

Mode 4: Mechanical Operation Panel to Actuate Multiple Equipments

Figure 4:
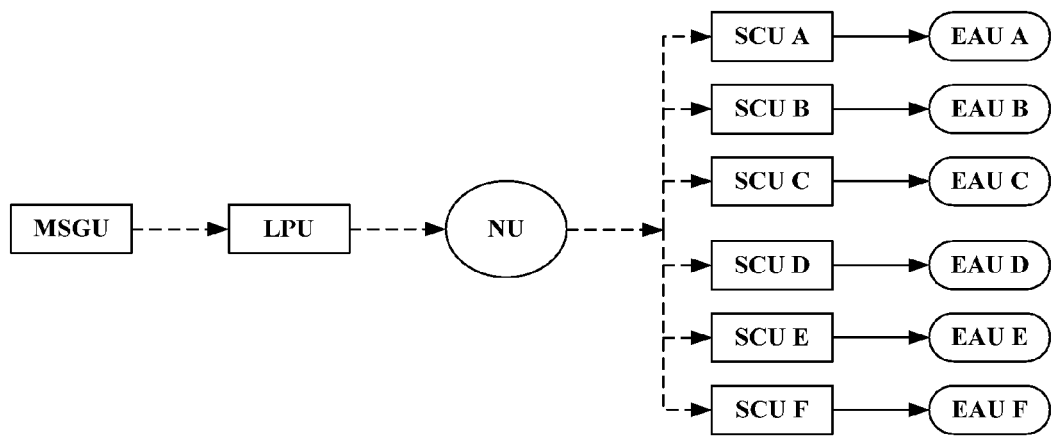
FIG. 4: Flow process diagram for mechanical operation panel to actuate single equipment (mode 4)
Figure 10:
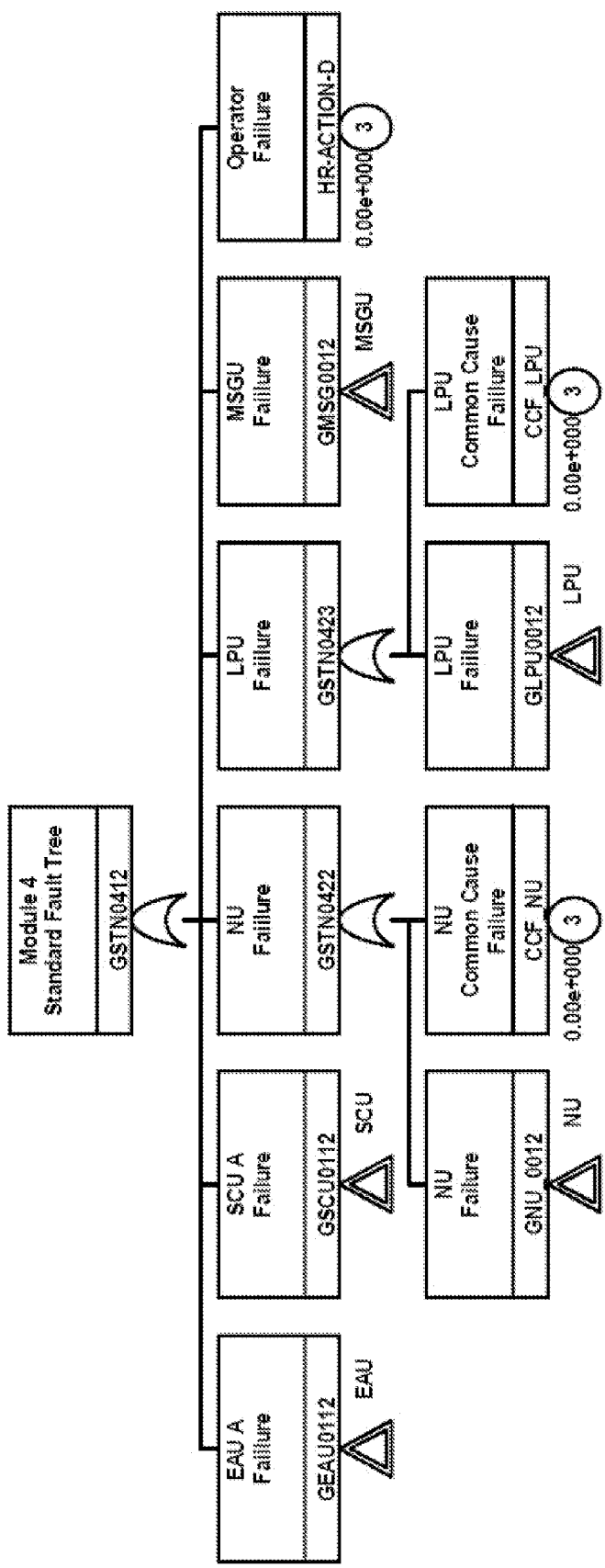
FIG. 10: Standard fault tree for mode 4.

The operation process is shown in FIG. 4. When the operator presses the button or turns the knob on the operation panel, the corresponding mechanical signal generation unit will output a digital signal. Since it is to actuate multiple equipments, the output signal is transmitted to the corresponding logic-processing unit, through which multiple equipment signals are output. Through network unit, the signals are transmitted to the designated signal conversion unit. After the digital signals are converted to analog signals, they are output to the equipment actuation unit to actuate the equipment. Since the fault tree uses equipment failure as top event, the developed standard fault tree as shown in FIG. 10 is also a serial linear process. The failure of any unit will cause the failure of the entire instrument control process. Since the equipment actuation relies on manual operation by the operator, the fault tree also includes the failure mode for manual operation by the operator. Since the standard fault tree in mode 4 is developed with focus on unit A failure, for failure of other units (unit B~unit F), except for the use of their own designated signal conversion unit and equipment actuation unit, they have the same signal source and the simulation mode for common cause failure as unit A.

Mode 5: Touch Screen to Actuate Single System

Figure 5:
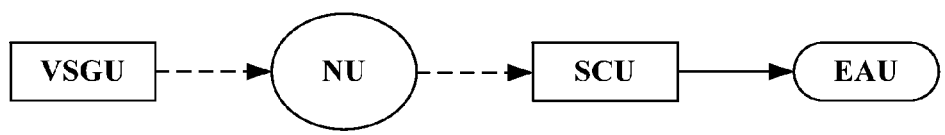
FIG. 5: Flow process diagram for touch screen display to actuate single equipment (mode 5)
Figure 11:
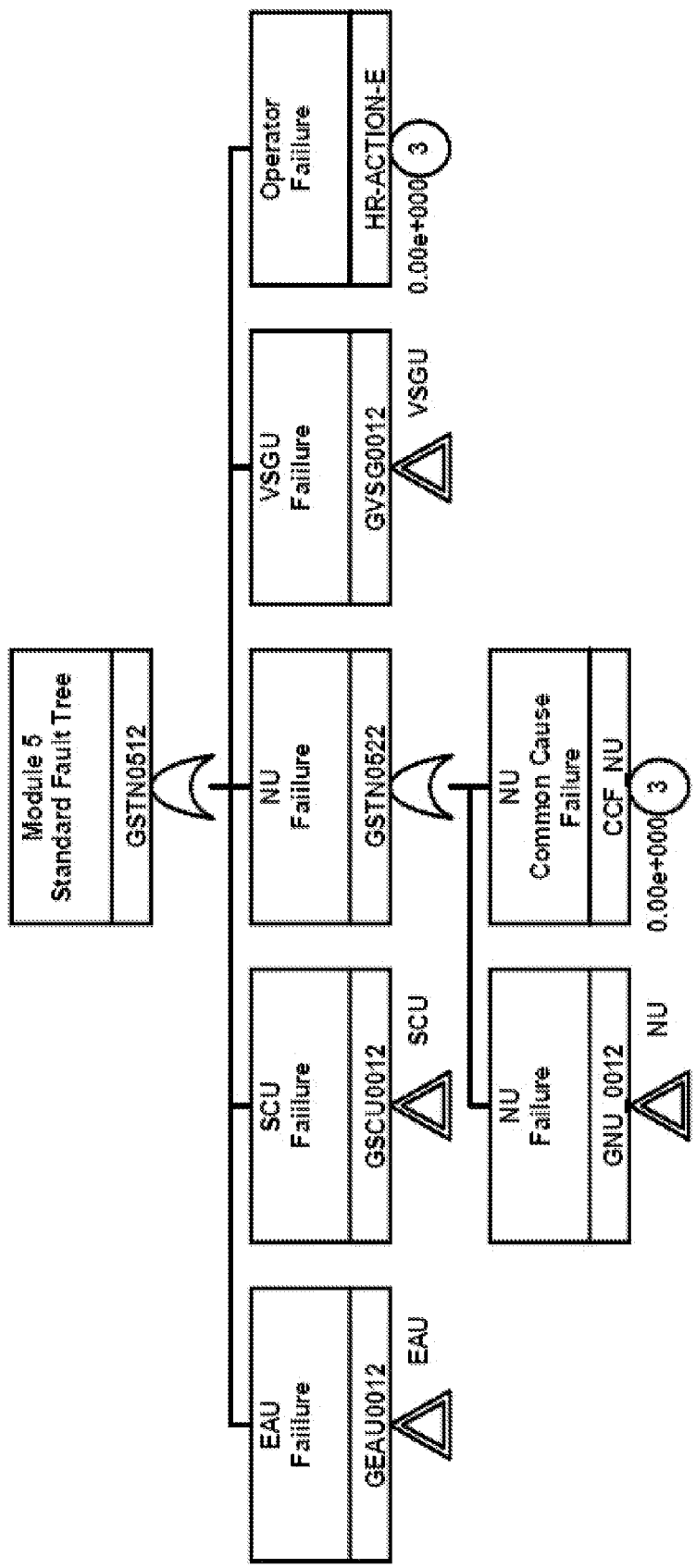
FIG. 11: Standard fault tree for mode 5.

The operation process is shown in FIG. 5. When the operator touches and makes selection on the selection menu, the screen touch signal generation unit will output the corresponding digital signal to the signal conversion unit through the network unit, and then the digital signal will be converted to analog signal and output to the equipment actuation unit to actuate the equipment. The developed standard fault tree is shown in FIG. 11. Since it is serial linear process, the failure of any unit will cause the failure of the entire instrument control process. Since the equipment actuation relies on manual operation by the operator, the fault tree also includes the failure mode for manual operation by the operator.

Mode 6: Touch Screen Display to Actuate Multiple Equipments

Figure 6:
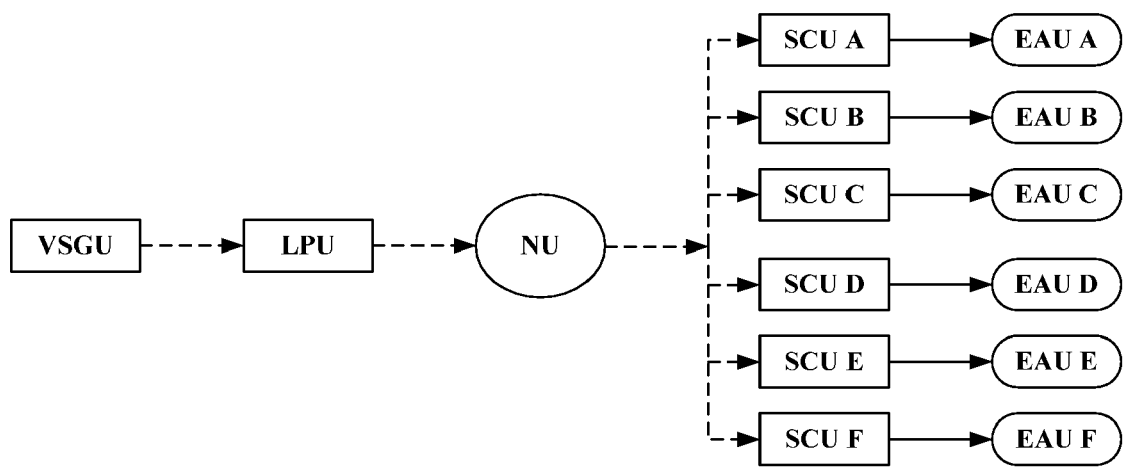
FIG. 6: Flow process diagram for touch screen display to actuate multiple equipments (mode 6)
Figure 12:
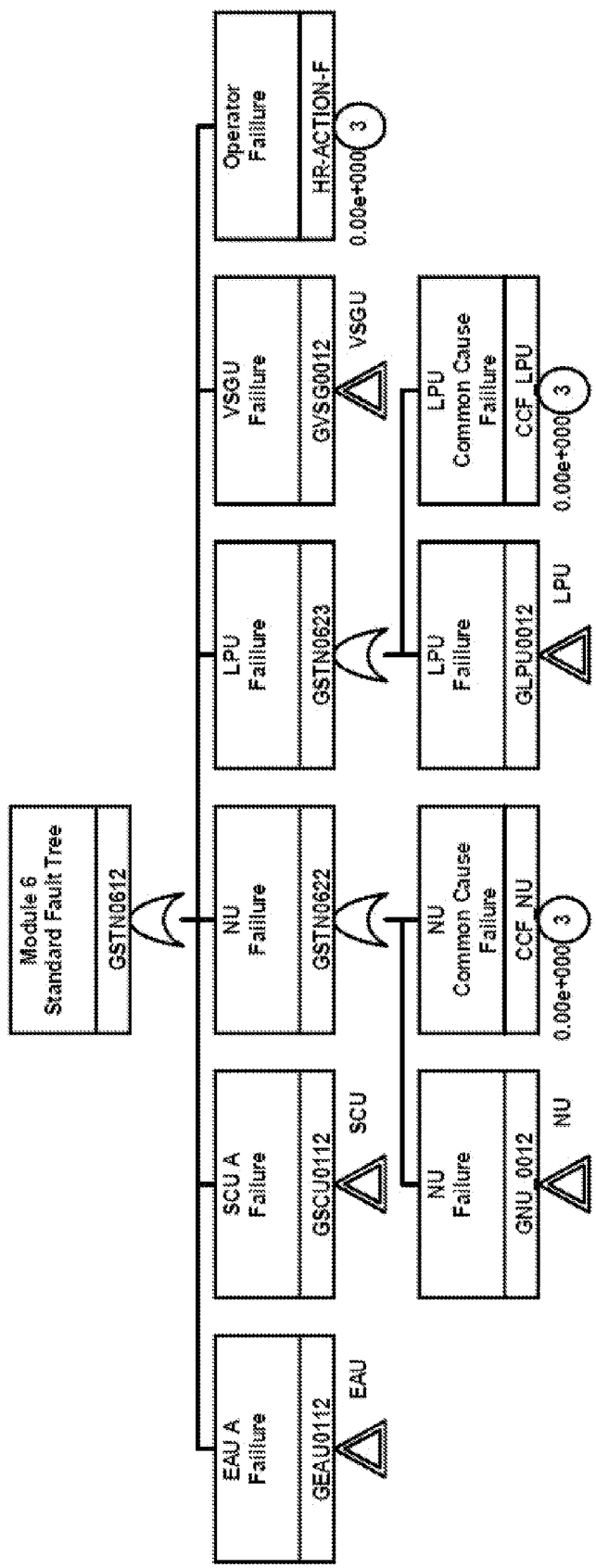
FIG. 12: Standard fault tree for mode 6.

The operation process is shown in FIG. 6. When the operator touches and makes selection on the selection menu, the screen touch signal generation unit will output the corresponding digital signal. Since it is to actuate multiple equipments, the signal is output to the corresponding logic-processing unit, which will output multiple equipment operation signals through the network unit to their own designated signal conversion unit. After the digital signal is converted to analog signal, it is output to the equipment actuation unit to actuate the equipment. Since the fault tree uses equipment failure as top event and the developed standard fault tree as shown in FIG. 12 also belongs to a serial linear process, the failure of any unit will cause the failure of the entire instrument control process. Since the equipment actuation relies on manual operation by the operator, the fault tree also includes the failure mode for manual operation by the operator. The standard fault tree for mode 6 is developed with focus on unit A failure. For failure of other units (unit B~unit F), except for the use of their own designated signal conversion unit and equipment actuation unit, they have the same signal source and the simulation mode for common cause failure as unit A.

The establishment of the fault tree for equipment operation is based on the above eight instrument control units and six standard digital instrument control processes, which all function by splitting signal source and connecting to standard fault tree to build the fault tree for the nuclear power plant with boiling water reactor that involves complicated operation signals. The establishment procedures are described as follows:

Step 1. Analyze Signal Source for Equipment Operation

With the instrument control logic diagram when analysis is conducted for signal source for equipment operation for the advanced boiling water reactor that not only involves signals for traditional automatically and manually operated single equipment but also automatic and manual signals to simultaneously operate multiple equipments, it is necessary to summarize and structure all the signals for the target equipments in the same system in details.

Step 2. Build Process Flow Diagram for Operation Signal

Figure 14:
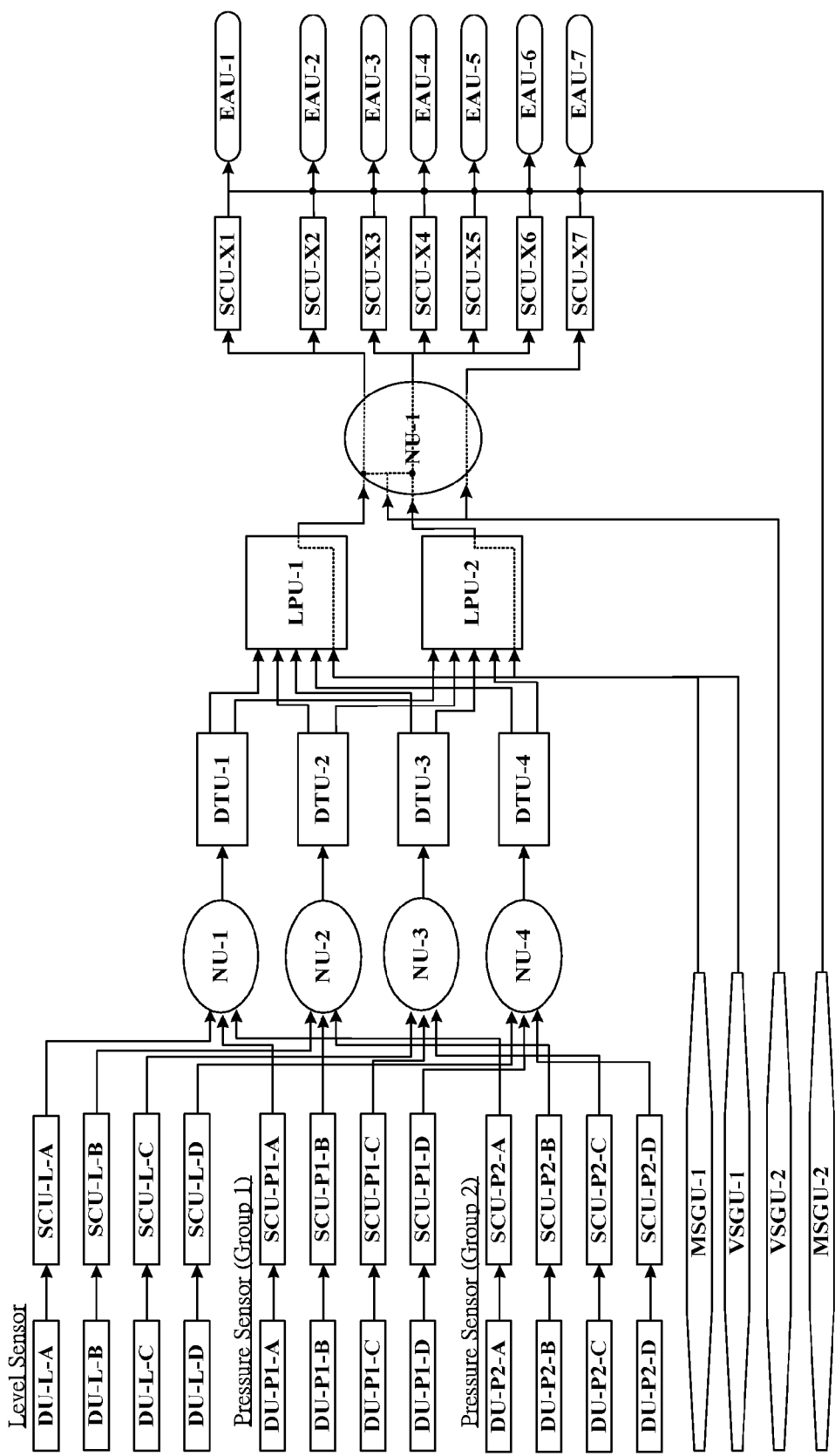
FIG. 14: Actual example for instrument control signal transmission for a nuclear power plant with advanced boiling water reactor.

After summarizing and structuring all the operation signals for the target equipments, the first thing necessary is to build the process flow diagram for all equipments to clarify the details with the generation and transmission of signals associated with each instrument control unit. All the instrument control units in the process flow control diagram should correspond to the above eight standard instrument control units. FIG. 14 shows the signal process flow diagram for all target equipments in a single system in a nuclear power plant with advanced boiling water reactor. The system includes seven equipments (EAU-1~EAU-7 responsible for actuation) that participate in the analysis. Each equipment has its own signal source. There are seven sources of signals to actuate the seven equipments. Water level detection unit, first pressure detection unit and second pressure detection unit provide automatic operation signals. The signals from these units will be sent to different logic processing units (LPU-1, LPU-2) for logic operation. Upon meeting the preset operation conditions for each equipment, the logic-processing unit will generate equipment operation signals that enable multiple equipment operation. There are four sources for manually generated operation signals. The manual signal from the mechanical signal generation unit MSGU-1 can go through LPU-1 and LPU-2 and simultaneously handle multiple equipment operation. The manual signal from the mechanical signal generation unit MSGU-2 is directly transmitted through hard wire to the equipment end. The manual signals from video signal generation units, VSGU-1 and VSGU-2, have different functions. VSGU-1 and MSGU-1 have the same function, complimentary to each other as backup signal generation unit. The signal from VSGU-2 can only operate one equipment at a time.

FIG. 14 clearly shows that a single instrument control module can be designed to handle multiple signal logic processing or transmission. NU-1 from the figure, as an example of network unit, is responsible for transmitting not only detection unit signals but also automatic and manual operation signals for equipment operation. Therefore, the establishment of a detailed system signal process flow diagram not only helps check the rationality for signal transmission and logic operation but also facilitates simulate common cause failure in the fault tree analysis.

Step 3. Split Operation Signal Source

After completion of the signal process flow diagram for system instrument operation, it is to split all the signal sources into an independent typical digital instrument control process based on the previously mentioned eight instrument control units and six typical digital instrument control flow processes. All the operation signals in FIG. 14, as an example, can be split into 12 signal flow processes, including (1) 2 automatic operation signal flow processes provided by water-level detection unit, (2) 2 automatic operation signal flow processes provided by the first pressure detection unit, (3) 2 automatic operation signal flow processes provided by the second pressure detection unit, (4) 2 manual operation signal flow processes provided by MSGU-1, (5) 1 manual operation signal flow processes provided by MSGU-2, (6) 2 manual operation signal flow processes provided by VSGU-1, (7) 1 manual operation signal flow process provided by VSGU-2. After splitting, it is necessary to match all the signal flow processes to the six modes from FIG. 1 to FIG. 6.

Step 4. Select and Revise Standard Fault Tree

After splitting in Step 3 for system equipment operation signals, every signal flow process can match one of the six modes. Each signal flow process should be revised by the corresponding standard fault tree. The instrument control units in an actual flow process are used to revise the standard fault tree. In revising fault tree, special attention shall be paid to the common instrument control unit shared by different signal sources. The common units shall use the same basic event name in different standard fault tree. Next, the signal logic operation in the fault tree shall select the suitable logic gate for actual design.

With the system instrument control flow process in FIG. 14 as an example, the manual operation signal flow process provided by the water-level detection unit, first pressure detection unit and second pressure detection unit can be classified as the mode 2 process in FIG. 2; the manual operation signal flow process provided by MSGU-1 can be classified as the mode 4 process in FIG. 4; the manual operation signal flow process provided by MSGU-2 can be classified as the mode 3 process in FIG. 3; the manual operation signal flow process provided by VSGU-1 can be classified as the mode 6 process in FIG. 6; the manual operation signal flow process provided by VSGU-2 can be classified as the mode 5 process in FIG. 5. In revising fault tree, special attention shall be paid to the common instrument control units such as NU, DTU and LPU shared by different signal sources. The common units shall use the same basic event name in different standard fault tree. Next, regarding the signal logic operation for the three detection units in the fault tree, it adopts two-out-of-four fault-tolerant design strategy and three-out-of-four logic gate.

Step 5. Link Standard Fault Tree

After completion of the fault tree for all signal sources, it is to link the fault tree to establish the specific fault tree to specific equipment operation. For specific equipment in the system, it is to select all the signal sources on the signal flow process diagram to operate the specific equipment, and then link all the corresponding standard fault trees into the fault tree for the specific equipment operation.

With the EAU-1~EAU-7 actuated equipments in FIG. 14 as example, EAU-2 and EAU-3 can accept all automatic or manual operation signals in the figure. The difference is that EAU-2 and EAU-3 receive the operation signal from different logic processing units, LPU-1 and LPU-2. EAU-7 cannot be operated by the automatic signals in the figure and is manually operated by the signals from MSGU-2 or VSGU-2.

What is claimed is:

1. A method for establishing an advanced fault tree for a nuclear power plant with an advanced boiling water reactor, comprising:
   i) analyzing sources of manual operation signals generated by mechanical signal generation units and video signal generation units and of automatic operation signals generated by water-level, temperature and pressure detection units;
   ii) building a process flow diagram for the manual operation signals and the automatic operation signals;
   iii) splitting the process flow diagram into multiple signal flow processes based on the sources, wherein the signal flow processes comprise (1) multiple flow processes of the automatic operation signals generated by the water-level, temperature and pressure detection units, (2) multiple flow processes of the manual operation signals generated by the mechanical signal generation units, and (3) multiple flow processes of the manual operation signals generated by the video signal generation units:

iv) selecting and revising standard fault trees, wherein multiple control units processing the manual operation signals and the automatic operation signals have identical event names among the standard fault trees; and v) linking the standard fault trees for a specific facility, wherein the sources of the manual operation signals and automatic operation signals, for operating the specific facility, are first selected based on the process flow diagram, and then correspondences of the standard fault trees are linked into the advanced fault tree for the specific facility.

2. The method of claim 1, wherein the automatic operation signals generated by the water-level, temperature and pressure detection units are transmitted to logic processing units generating specific signals for the specific facility and for simultaneous operation of multiple facilities.

3. The method of claim 1, wherein the manual operation signals generated by a first type of the mechanical signal generation units and processed by the logic processing units operate multiple facilities, and the manual operation signals generated by a second type of the mechanical signal generation units are transmitted to the multiple facilities by wires.

4. The method of claim 3, wherein the manual operation signals generated by a first type of the video signal generation units are complementary to the manual operation signals generated by the first type of the mechanical signal generation units, and the manual operation signals generated by a second type of the video signal generation units operate only one facility at a time.

* * * * *